(12) United States Patent
Schipper et al.

(10) Patent No.: US 7,865,524 B2
(45) Date of Patent: Jan. 4, 2011

(54) METHOD OF CAPTURING SCENE AND RECORDER WITH MEANS OF PERFORMING THIS METHOD

(75) Inventors: Alphonsus Tarcisius Jozef Maria Schipper, Eindhoven (NL); Martin Bosgra, Groningen (NL); Cornelis Velde, Leeuwarden (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1680 days.

(21) Appl. No.: 10/515,751

(22) PCT Filed: May 19, 2003

(86) PCT No.: PCT/IB03/02141

§ 371 (c)(1),
(2), (4) Date: Nov. 24, 2004

(87) PCT Pub. No.: WO03/102955

PCT Pub. Date: Dec. 11, 2003

(65) Prior Publication Data

US 2005/0220279 A1    Oct. 6, 2005

(30) Foreign Application Priority Data

May 31, 2002    (EP) .................................. 02077160

(51) Int. Cl.
*G06F 17/00*    (2006.01)

(52) U.S. Cl. ...................... 707/791; 707/802; 707/822; 707/828

(58) Field of Classification Search .......... 707/600–831
See application file for complete search history.

(56) References Cited

U.S. PATENT DOCUMENTS

| 5,568,208 A | 10/1996 | van de Velde |
| 6,141,489 A * | 10/2000 | Honda .......................... 386/95 |
| 6,879,769 B1 | 4/2005 | Kawai et al. |

FOREIGN PATENT DOCUMENTS

| JP | 06-082859 | 3/1994 |
| JP | 08-198686 | 8/1996 |
| JP | 2001126451 A1 | 5/2001 |

* cited by examiner

*Primary Examiner*—Isaac M Woo

(57) ABSTRACT

An automatic update is performed by an archiving device that controls the device carrying the sequentially accessible recording medium. The update can be performed according to a full scan algorithm or to an append algorithm. Both algorithms arrange things so that only those scenes are captured to the archiving medium that are more recent than the last scene captured in a previous session. The reference for the age is the Recording Date and Time. The full scan algorithm does not make assumptions about how a recording medium has been recorded, whereas the append algorithm is intended for recording media used by appending new material after old material. The method of capturing scenes is especially useful for a disk recorder. The data captured may be an audio/video-stream of a camcorder or the files of a personal computer.

17 Claims, 8 Drawing Sheets

| Last RD&T = 2002-01-11;07:12:13 | | | |
|---|---|---|---|
| RD&T [yyyy-mm-dd;hh-mm-ss] | Tape counter [n-bit] | Scene's physical order | Marker |
| [2002-01-15;10-30-50) | [0000] | Scene Nr 1 | Beginning |
| [2002-01-15;10-30-51) | [0001] | | |
| [2002-01-15;10-30-52) | [0002] | | |
| ... | ... | | |
| [2002-01-15;10-31-06) | [0016] | | End |
| [2002-01-10;13-15-07) | [0017] | Scene Nr 2 | |
| [2002-01-10;13-15-07) | [0018] | | |
| [2002-01-10;13-15-07) | [0019] | | |
| ... | ... | | |
| [2002-01-10;13-15-17) | [0028] | | |
| [2002-02-27;05-27-12) | [0029] | Scene Nr 3 | Beginning |
| [2002-02-27;05-27-13) | [0030] | | |
| [2002-02-27;05-27-14) | [0031] | | End |
| ... | ... | | ... |

FIG. 11a

| Last RD&T = 99-06-05 / 12:18:21 | | | |
|---|---|---|---|
| RD&T [yy-mm-dd / hh:mm:ss] | Time Code [hh:mm:ss:ff] | Scene's physical order | Marker |
| [99-06-03 / 10:12:15] | [00:00:00:00] | Scene Nr 1 | Beginning |
| [99-06-03 / 10:12:15] | [00:00:00:01] | | |
| [99-06-03 / 10:12:15] | [00:00:00:02] | | |
| ... | ... | | |
| [99-06-03 / 10:12:15] | [00:00:00:24] | | |
| [99-06-03 / 10:12:16] | [00:00:01:00] | | |
| [99-06-03 / 10:12:16] | [00:00:01:01] | | |
| [99-06-03 / 10:12:16] | [00:00:01:02] | | |
| ... | ... | | |
| [99-06-03 / 10:13:33] | [00:01:18:03] | | End |
| [99-06-03 / 13:18:12] | [00:01:18:04] | Scene Nr 2 | Beginning |
| ... | ... | | |
| [99-06-03 / 13:19:03] | [00:02:09:03] | | End |
| [98-12-01 / 18:16:02] | [00:02:09:04] | Scene Nr 3 | |
| ... | ... | | |
| [98-12-01 / 18:17:02] | [00:03:09:04] | | |
| [99-06-05 / 17:51:12] | [00:01:18:04] | Scene Nr 4 | Beginning |
| ... | ... | | |
| [99-06-05 / 17:53:12] | [00:05:09:05] | | End |
| ... | ... | | ... |

FIG. 11b

METHOD OF CAPTURING SCENE AND RECORDER WITH MEANS OF PERFORMING THIS METHOD

The invention concerns an archiving device carrying an archiving medium such as a disk-recorder that uses a disk to archive the scenes transferred from a camera, a camcorder or any other device carrying a sequentially accessible recording medium. In the following text a recording device is used instead of a camera, camcorder or other device carrying a sequentially accessible recording media and an archiving device is used for devices carrying an archiving medium such as any kind of disk recorder (HDD, DVD+RW, DVD-R, DVD-RW, DVD-RAM, DVD+R).

Camcorders in general have a means of recording pictures and sound. These scenes can for example be recorded on a tape. Together with the scenes, the date and time of recording (in the following text RD&T) are stored. In typical home recording situations new scenes are added to the tape once in a while. The tape can be viewed on the camcorder display itself or from a video recorder that captured the camcorder recordings in advance. The video recorder can be fixed into the home Audio/Video stack so that the television screen can be used as a monitor for example. In general, viewing scenes from a video recorder using a disk as a recording medium is more convenient than viewing scenes from a tape, as the disk offers better scene access and a better table of contents so that the user can easily skip certain scenes.

The sequentially accessible recording medium, e.g. a tape, has little archiving capacity measured in time with reference to its size. So, for long term storage and archiving it is common to use disks such as Hard Disks, Digital Versatile Disks (DVD)+Re-Writing or other DVD media. Due to a higher compression disks offer more archiving capacity measured in time with reference to their size.

This means that there are two main reasons for capturing the scenes from tape to disk: the first is the greater convenience when viewing, the second is the improved archiving.

As the archiving medium typically has a higher archiving capacity than the recording medium the archiving medium will be updated from time to time.

Scenes can be captured from tape to disk and updates can be performed manually. Therefore, the user has to know or find out which scenes have already been captured and which have not. As the scenes on the tape are not necessarily stored in chronological order, manual capturing the scenes is a difficult and error-prone process. If the user wants to ensure that every scene recorded after the last update is captured from tape to disk he has to rewind the tape to the beginning, start playing the tape and start recording at the same time if he finds out that a new scene is beginning. All this requires a lot of user attention and interaction.

The U.S. Pat. No. 5,568,208 reveals a video camera/camcorder mounted transmitter for transmitting audio, video, time code and tally status signals through an omnidirectional antenna. The signals are transmitted to a receiver that demodulates the signals and then stores the data or visualizes them. There is not a hint in the document that the receiver controls the camcorder for example. FIG. 1 especially makes it evident that the camcorder is only prepared for transmission.

The WO 01/13639 shows a system and method of archiving data transmitted from a variety of sources (via the Internet, direct transmission, cable, etc.) and for the retrieval of the stored data by different users. The stored signals are time and data stamped, identified by the originating site and camera, so that they can be easily found and retrieved based on the time and place of record. This system consists of a camera that transmits the signals to a central station. It is not foreseen that the central station should control the camera.

JP 08-198686 reveals a system for dubbing from a camera integrated video tape recorder to an external video tape recorder. The system is remote-controlled. The user controls the camera integrated video tape recorder, i.e. the reproduction device and also the separate video tape recorder or recording device. The external video tape recorder is set in a recording state through the compilation remote controller. There is not a hint of a method by which the recording device (external video tape recorder) controls the reproduction device (camera integrated video tape recorder).

Also JP 06-082859 shows a dubbing method. In this system the start signal is transmitted from the camera integrated video tape recorder to the external video tape recorder by using a remotely controlled transmission part.

The miroVIDEO DV200 user's guide version 2.0/GB November 2000 by Pinnacle Systems, Braunschweig, Germany reveals a board to transfer DV Video from the DV tape to the PC hard disk. This board is a control device for an individual adaptation of settings as regards the video and audio input, the output and the overlay. The miroVIDEO DV200 therefore scans the tape and displays the contents on the PC monitor or LCD. Scanning merely identifies the clips on the tape so that the user can see which clips he wants to capture and save to the hard drive. Once the digital clip is in the PC's hard disk it can be edited using specific software. A clip is a certain extract from the audio and video stream of the DV tape. When the procedure of individual adaptation is started, the control device searches on the tape for an in point (start of take) and an out point (end of take) and then captures the video sequence located between these two points. The in point and out point are manually defined in advance by the user. The in point and out point are identified by time codes. Time codes are stamps that mark the chronological position of a scene within a video sequence, calculated for example in hours:minutes:seconds. Although the control device of the miroVIDEO DV200 searches on the DV tape for a time code there is no hint in this user's guide about comparing the time codes with those captured on the hard disk drive in the past.

One object of the invention is to provide a method of capturing data that comprise a recording date and time, and have been recorded by a device carrying a sequentially accessible recording medium, on an archiving medium. This method is supposed to be less error-phone. This is a means of automatically updating the archiving medium.

Another object of the invention is to provide an archiving device that is adapted to perform this method.

As regards the method, the problem is solved by the device carrying the archiving medium controlling the device carrying the recording medium. For example, this means that the disk-recorder controls the camcorder during the update process.

As regards the archiving device, the problem is solved by a means of controlling the device carrying the recording medium.

There are two variants for performing the inventive method. One variant is the full scan algorithm and the other the append algorithm.

Both methods arrange things so that only those scenes that are more recent than the last scene captured in a previous session are captured to the archiving medium. The reference for the age of the scenes recorded on the camcorder's tape is the Recording Date and Time (RD&T). The full scan and the append method both contain a certain algorithm that is described below. The device carrying the archiving medium may be adapted to execute one of the two methods or may execute both methods. In this case, the user has to choose which one should be executed. For that purpose, the device carrying the archiving medium has an input signal means containing the user's request.

The full scan algorithm does not make assumptions about how a recording medium has been recorded. The recording medium is approached as a collection of non-chronologically recorded scenes. Nevertheless, the scenes are captured to the archiving medium in the order of their RD&Ts. For that purpose, the full scan algorithm carries out the steps of:
- scanning the sequentially accessible recording medium
- determining scenes that comprise continued recording date and time
- determining whether scenes have already been captured on the present archiving medium and the recording date and time of the last captured scene
- comparing recording date and time of the scanned scenes with the last recording date and time on the archiving medium
- capturing those data comprising an audio/video signal and a recording date and time, the recording date and time of which is more recent than the last recording date and time on the archiving medium.

The result of the scanning is inserted advantageously into a list in which the RD&T of the scenes is combined with their position on the sequentially accessible recording medium. To construct this list the full scan algorithm carries out the steps of:
- constructing a list of scenes in the device carrying the archiving medium with the scenes in the order in which they are physically located on the sequentially accessible recording medium
- placing a first scene begin marker in a local data structure indicating the place on the sequentially accessible recording medium where the oldest scene to be captured begins
- placing a first scene end marker in a local data structure indicating the place on the sequentially accessible recording medium where the oldest scene to be captured ends
- placing a second scene begin marker in a local data structure indicating the place on the sequentially accessible recording medium where the second oldest scene to be captured begins,
- placing a second scene end marker in a local data structure indicating the place on the sequentially accessible recording medium where the second oldest scene to be captured ends,
  - continuing this loop until there are no more scenes to add.

The scene end marker may be automatically placed in the list when a discontinuity is found in the recording dates and times.

The position of the scenes on the recording medium may be defined by the format of an n-bit tape counter. For example a 4-bit counter: 0000, 0001, 0002, ... up to a maximum of 9999. For that purpose, the tape counter has to be reset to 0 once the sequentially accessible medium is rewound to the beginning. Another possibility of defining the position is to use the pre-format that is added to the sequentially accessible medium during recording. The pre-format can be the time code added with every single picture. The number of pictures recorded per second depends on the used standard. For example, the Phase Alternation Line (PAL) has a frame rate of 25 frames per second. The time code usually has the format [hh:mm:ss:ff], wherein with hh represents hours, mm represents minutes, ss represents seconds and ff represents the frames per second.

Most advantageously, the scenes are captured to the archiving medium in their chronological order independently of the physical order of their appearance on the recording medium.

To ensure that the inventive method automatically updates the archiving device it is particularly advantageous that the list in the archiving device is checked after another scene has been captured. For that purpose, the full scan algorithm captures the scenes to the archiving medium by performing the following steps:
- making the device carrying the sequentially accessible recording medium wind the recording medium to the position corresponding to the scene begin marker in the list
- making the device carrying the sequentially accessible recording medium start playing
- transferring the scenes via a connection to the device carrying the archiving medium
- capturing those scenes to the archiving medium
- stopping the device carrying the recording medium when the end of the position corresponding to the first scene end marker is reached
- refreshing the last RD&T known
- inquiring if there are any RD&Ts still in the list
- determining which scene begin marker is closest to the current last RD&T known
- finishing the full scan algorithm if there are no more RD&Ts left in the list.

The inventive method of performing the append algorithm is intended for media that are used by appending new material after old material. Before a new scene is recorded to the tape, the tape is positioned at the end of the last recording (last RD&T known). The search for that point is supported by camcorders for example. Usually they are equipped with an "end search" button. Pressing this button will position the tape just after the end of the last added scene, i.e. the last RD&T known. If the end of the tape is approached or reached during recording, the camcorder user may choose to continue recording at the beginning of the tape. The sequentially accessible recording medium is used as a circular buffer so that older recordings are overwritten. The append algorithm carries out the following step:
- verifying if the inserted archiving medium has a last RD&T stored in its settings,
- making the device carrying the sequentially accessible recording medium start playing so that an audio and video stream is transferred to the disk recorder,
- comparing the currently received RD&T with the last RD&T of the archiving medium,
- making the recording device start winding or rewinding the sequentially accessible recording medium to the point of the last RD&T of the archiving medium depending on the result of the comparison,
- making the recording device start playing when the point of the last RD&T is found on the sequentially accessible recording medium, while the archiving medium captures the received audio/video stream at the same time.

As during recording the sequentially accessible recording medium is rewound to the beginning when the end is reached, the append algorithm for controlling the recording device does the same remotely. The append algorithm also makes the sequentially accessible recording medium rewind to the beginning when a gap is found.

Advantageously the update process is started by an input signal from the user. For that purpose, the archiving device has an input signal means and carries out the steps of:

- initiating the update by pushing the "start" button on the device carrying the archiving medium
- asking the user to decide whether a full scan should be performed
- initiating the append algorithm if the next input signal comes from the "no" button
- initiating the full scan algorithm if the next input signal comes from the "yes" button.

With reference to the archiving device, it may control the device carrying the recording medium by means of a cordless or cord requiring interface such as the IEEE1394, the IrDS standard or the bluetooth standard. The archiving device advantageously, uses a bi-directional connection for receiving the data stream and transporting the commands.

When the archiving device is equipped with a non-volatile memory, the identification (ID) of different, replaceable archiving media can be stored in it, even together with the last RD&T known.

In one embodiment the archiving device is a disk recorder and the archiving medium is one of the group consisting of: compact disc, digital versatile disc, hard disk.

A recorder for capturing data on an archiving medium according to the invention comprises
- a means of inputting a command
- a means of reading the settings of said archiving carrier
- a means of controlling a device carrying data on a sequentially accessible recording medium
- a means of receiving the data.

When the recording device is a Personal Computer the inventive capturing method can be used for the incremental back up in personal computers.

An advantage of the inventive device is that the user only has to connect both devices and insert the recording medium with the new scenes and the archiving medium to be updated. Thus, the inventive method permits the easy updating of the archiving medium that serves as an archive. After initiation the inventive method starts the algorithm required by the used and the recording device is automatically controlled by the archiving device.

One advantage of the inventive append algorithm is that is enables the user to simultaneously view the newly recorded video information with the update.

The objects and advantages of the present invention will become more readily apparent to those ordinarily skilled in the art after review of the following detailed description and accompanying drawings, wherein:

FIG. 11 shows possible contents of the list.

The following definitions are used in the figures:

Scene: A piece of continuous recording with a certain duration.

RD&T: Recording Date and Time.

Data: Video/Audio and Recording Date & Time signal

Blank: A piece of the recording medium on which nothing was previously recorded.

Recording: Recording a scene on a sequentially accessible archiving medium, i.e. the recording medium.

Capturing: Copying a scene from the recording medium to the archiving medium.

Figure 1:
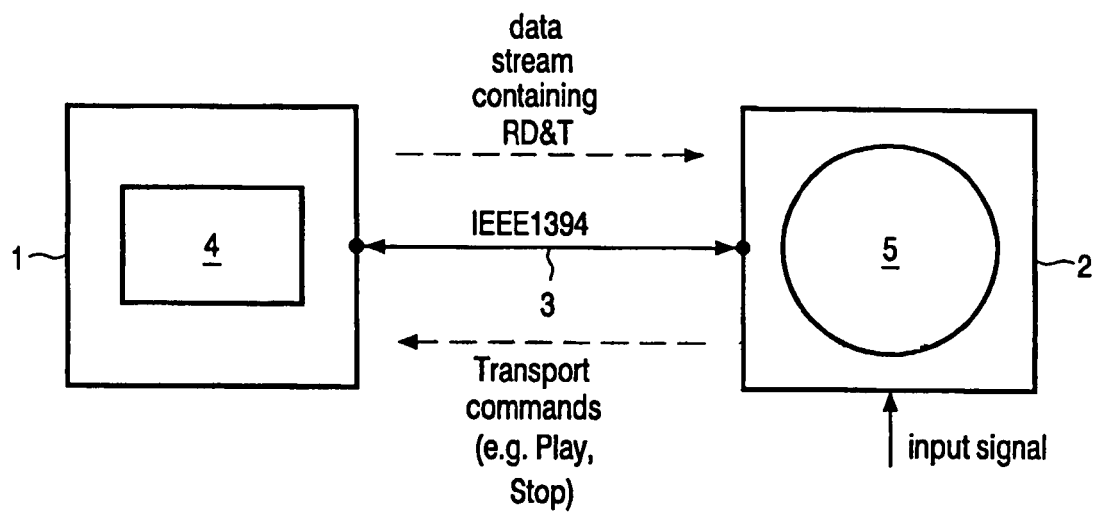
FIG. 1 shows the set up for update disk.

FIG. 1 shows one embodiment for the set-up that uses an IEEE1394 as interface 3. The interface 3 connects a recording device 1 carrying a sequentially accessible recording medium 4 with an archiving device 2 carrying an archiving medium 5. The sequentially accessible recording medium 4 is also replaceable and typically used as a circular buffer. As in conventional systems a data stream, e.g. a video/audio stream, containing the Recording Date and Time (RD&T) is transferred from the recording device 1 to the archiving device 2. The novelty is that the archiving device 2 controls the recording device 1. For the transport of the control commands such as play, stop or rewind, for example, the archiving device 2 preferably uses an interface 3. Not shown in FIG. 1 is the fact that archiving device 2 contains a non-volatile memory, e.g. a Random Access Memory (RAM). In another embodiment of the invention the recording device 1 is controlled cordlessly via a remote control, e.g. with the bluetooth standard or the IrDA standard. The archiving media 5 are replaceable; each of them has identification such as an Identification number (ID). When an archiving medium 5 is entered into the archiving device 2 it is recognized by its Identification number. The non-volatile memory of the archiving device 2 has several entries. Each entry consists of a couple of data that contain the Identification number and the last known Recording Date and Time (last RD&T known). The input signal is generated by the user, e.g. by pushing an update button.

Alternatively the last RD&T known may be stored on the archiving medium 5.

Figure 2:
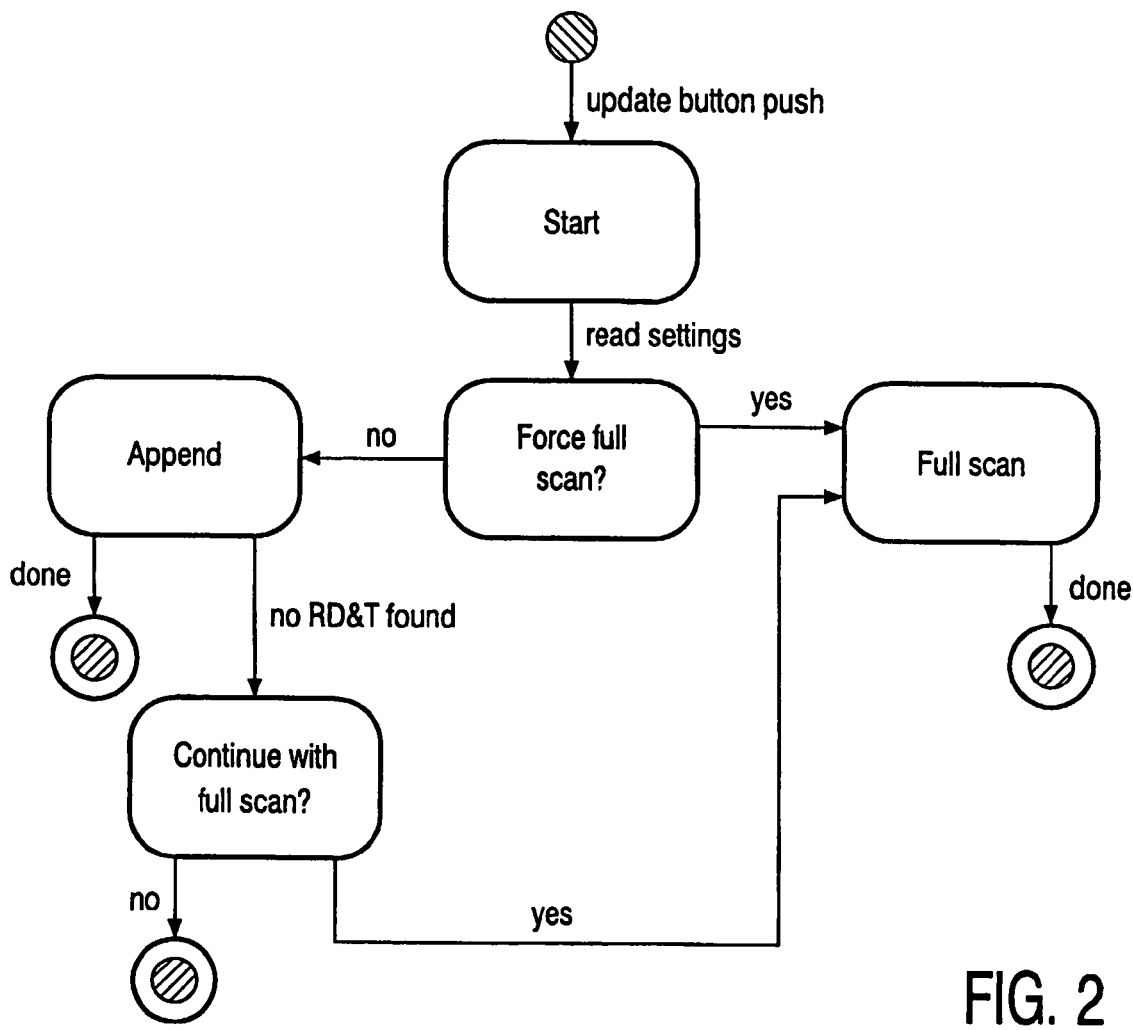
FIG. 2 shows a stage chart showing the update disk state machine.

FIG. 2 is a state chart showing the update disk state machine. The update is initiated by pushing the "start" button of the archiving device after connecting the recording device to the archiving device. The settings of the currently inserted disk are then read. The settings are the identification and the last Recording Date & Time known for example. Afterwards the user is asked to decide whether a full scan method should be performed. If the "yes" button is pushed as reply, the full scan algorithm is initiated. When the full scan algorithm ends the update is done. If the "no" button is pushed, the append algorithm is initiated. The append algorithm verifies, if a Recording Date and Time belonging to the inserted archiving medium is found, either on the archiving medium itself or in a non-volatile memory. If Recording Date and Time information is found, the append algorithm continues until the update has been completed. If no Recording Date and Time is found, the user is asked whether a full scan should be executed. If the "yes" button is pushed, the full scan is initiated, if the "no" button is pushed, the process ends without an update.

Figure 3:
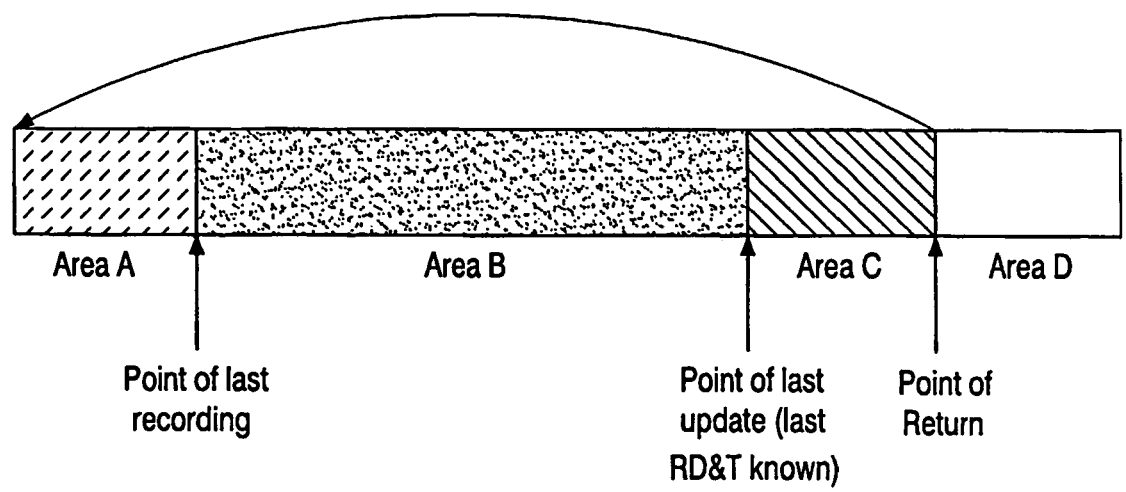
FIG. 3 shows areas of an append-recorded tape.

FIG. 3 shows the areas of an append-recorded medium. The append method of recording is intended for media used by appending new material after old material. Before a new scene is recorded to the tape, the tape is positioned at the end of the last recording. The search for that point is supported by camcorders for example. Usually they are equipped with an "end search" button. Pressing this button will position the tape just after the end of the last added scene, i.e. the last RD&T known. If the end of the tape is approached or reached, the camcorder continues recording at the beginning of the tape. The tape is used as a circular buffer so that older recordings are overwritten. In this example the letters A to D denote:

A An area from the beginning of the tape up to the point of last recording.
B An area from the last point of recording up to the point of last update.
C An area from the last point of update to the point where the recording was continued at the start of the tape.
D An area with either old material or blank tape.

The RD&T will consecutively increase in the order of sequence of Area B-Area C-Area A. The append algorithm searches on the recording medium for the point stored as the last RD&T known in the non-volatile memory or on the archiving medium. From this point onwards it will start capturing scenes until is has reached the point of the last recording. The current position of the recording medium at the beginning of the append algorithm is irrelevant, as during the update the archiving device controls the recording device in that the tape is wound to the corresponding point of the last update.

Figure 4:
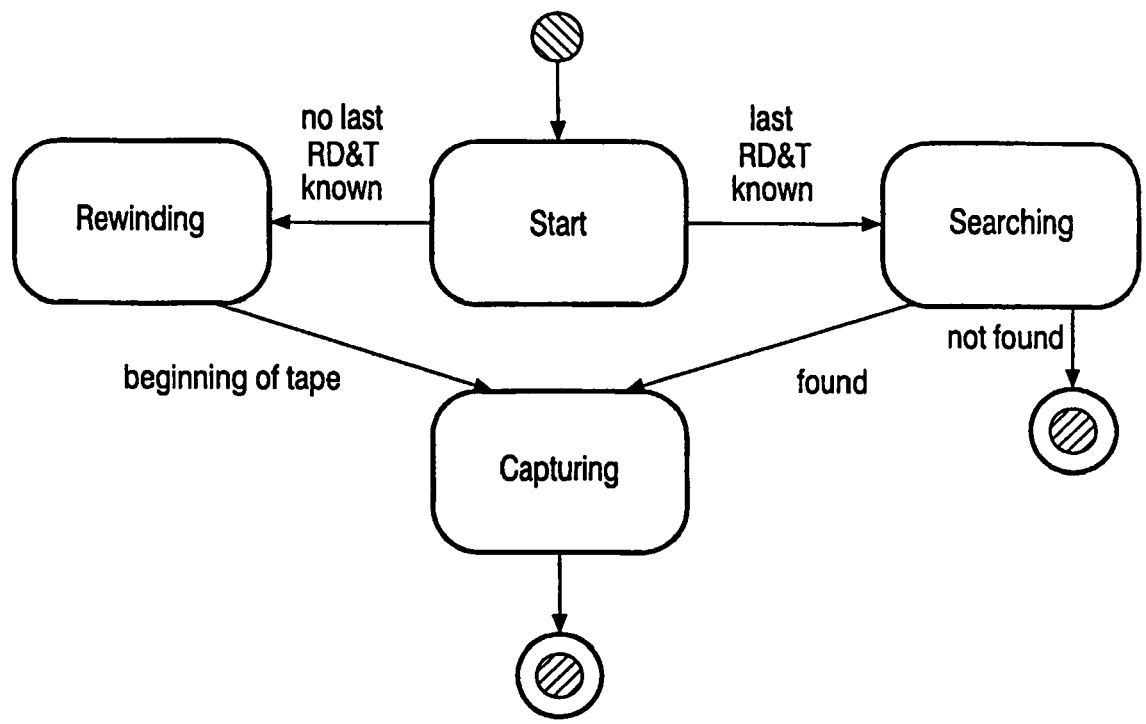
FIG. 4 shows an overall state machine for the append method.

FIG. 4 shows the overall state machine for the append method. The algorithm for the append method will try to fetch the last RD&T known from the non-volatile memory or from the archiving medium itself. If an RD&T is not stored together with the identification, it means that the disk has never previously been updated. Consequently, the archiving recorder rewinds the recording medium completely. When the beginning of the recording medium is reached, the archiving device makes the recording device play and at the same time starts the capturing procedure itself. If the append algorithm finds a last RD&T known stored together with the identification, then the archiving medium makes the recording device start searching for that point on the recording medium.

Figure 5:
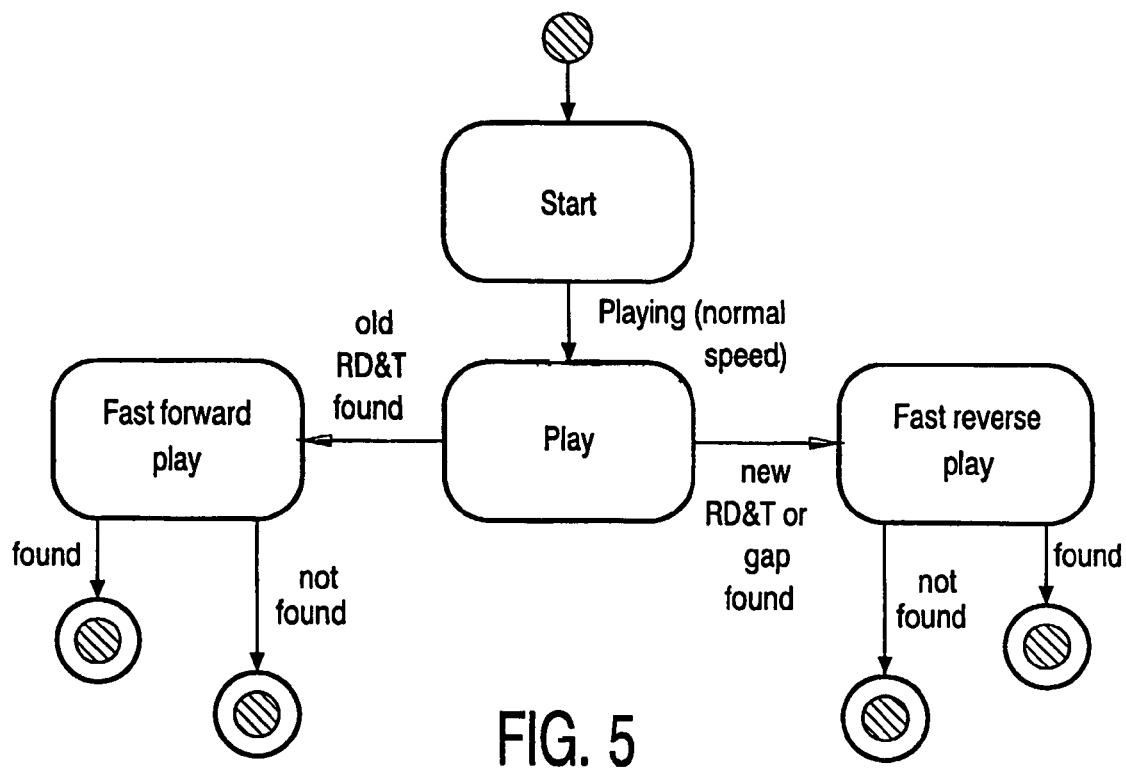
FIG. 5 shows details of the searching super-state of the append method.

FIG. 5 shows details of the searching super-state of the append method. When the archiving device is initiated, a start command is transferred to the recording device, which converts this command to the corresponding action, i.e. the recording device starts playing. Together with a data stream containing the scenes the RD&T is transferred to the archiving device. There the automatic update device compares the RD&T received with that stored in the non-volatile memory or on the storage medium itself. If the RD&T received is more recent than the one stored or no RD&T is received, then the archiving device makes the recording device rewind until the desired RD&T is found or until the beginning of the tape is reached. If the RD&T received when the recording device starts playing is older than the one fetched from the non-volatile memory or the archiving medium itself, the archiving device makes the recording device fast forward according to the automatic update until the desired RD&T is found or until the end of the tape.

At the beginning of the append algorithm the archiving device tries to identify the inserted archiving medium and compares its identification with the ones stored in the non-volatile memory. If the current archiving medium has already been updated by the inventive device, then its identification is stored together with the last RD&T known in the non-volatile memory. If the archiving device does not find the inserted archiving medium identification in the non-volatile memory a command for rewinding (fast reverse play) to the beginning of the recording medium is transferred to the recording device. The play command is then transferred to the recording device and the stream of audio/video data is captured by the new or deleted archiving medium.

In case the last known RD&T stored in the non-volatile memory does not exist anymore on the recording medium, e.g. it has been overwritten; the inventive device will indicate the fact that is has not been found. The indicators may be a lamp, an LED, a text on a display or an acoustic signal.

Figure 6:
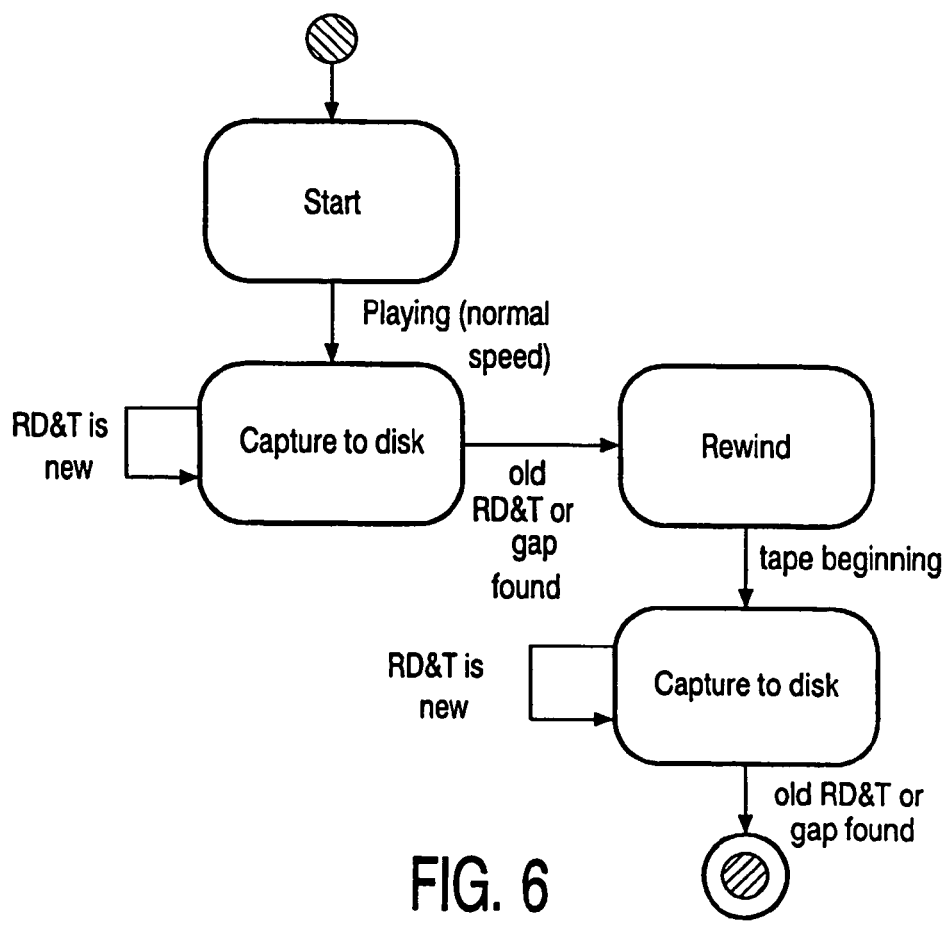
FIG. 6 shows the capturing super-state for the append method.

FIG. 6 shows the capturing super-state for the append method from the point onwards when the first RD&T is found. The append algorithm makes the archiving device send a "play" command to the recording device. As a reply, the current RD&T will be received together with the transferred signals. The archiving device contains a unit for the continued comparison of the RD&T received and the one fetched from the non-volatile memory. In case the result is that the scene on the recording medium is more recent than the ones already captured on the archiving medium the archiving device will capture these new scenes. As soon as the result is that the scenes played from the recording medium are older than the ones already captured to the archiving medium, or a gap is found, the recording device is rewound to the beginning for circular recording. If there are new scenes at the beginning of the recording medium they are added to the archiving medium as described.

So far only the algorithm for the append method has been described. In the following paragraphs the full scan method is explained. This algorithm does not make assumptions about how a recording medium has been recorded. The recording medium is approached as a collection of scenes recorded in non-chronological order. Nevertheless the scenes are captured to the archiving medium in the order of their RD&Ts.

Figure 7:
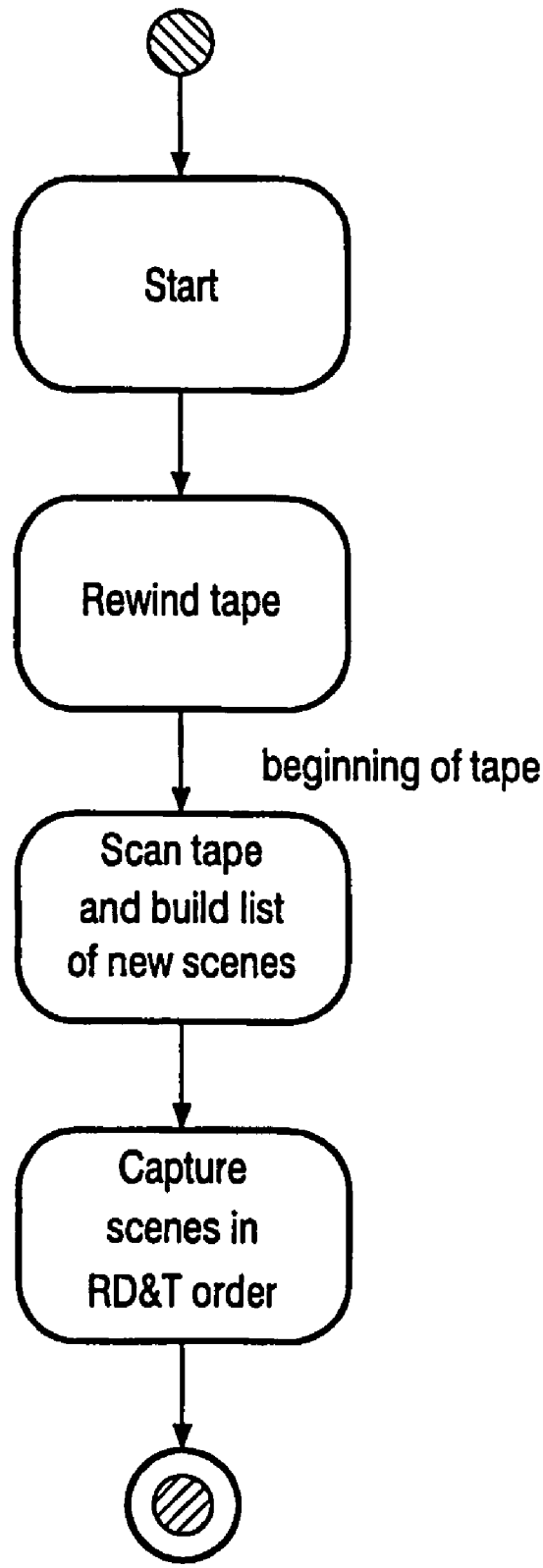
FIG. 7 shows an overall state machine for the full scan method.

FIG. 7 shows the overall state machine for the full scan method with an example of a tape. The full scan algorithm first rewinds the tape to the beginning, scans it and constructs a list of scenes in the order in which they are present on the tape. After the scene list has been constructed that scene is selected from the list, which is the oldest but is still more recent than the last scene added to disk. For an age comparison the last RD&T is fetched from the non-volatile memory of the archiving medium itself. The archiving device then makes the camcorder wind the tape to the position prior to this oldest scene of the list and then start playing the tape. At the same time the scene is captured. After the scene has been captured the last added RD&T is updated and the next scene is added to the archiving medium as described above. This process stops if there are no more scenes to add. The scan tape super-state can be broken down into a few simple components. First the state will start the camcorder by sending the "play" command. It will then try to find new RD&Ts from the scene transferred to the archiving device via the interface. If it has found a new RD&T a scene begin marker is placed automatically. As soon as an RD&T discontinuity is found (i.e. the scene changes) a scene end marker is placed automatically in the list. The archiving device then starts the search for more recent scenes again.

Figure 8:
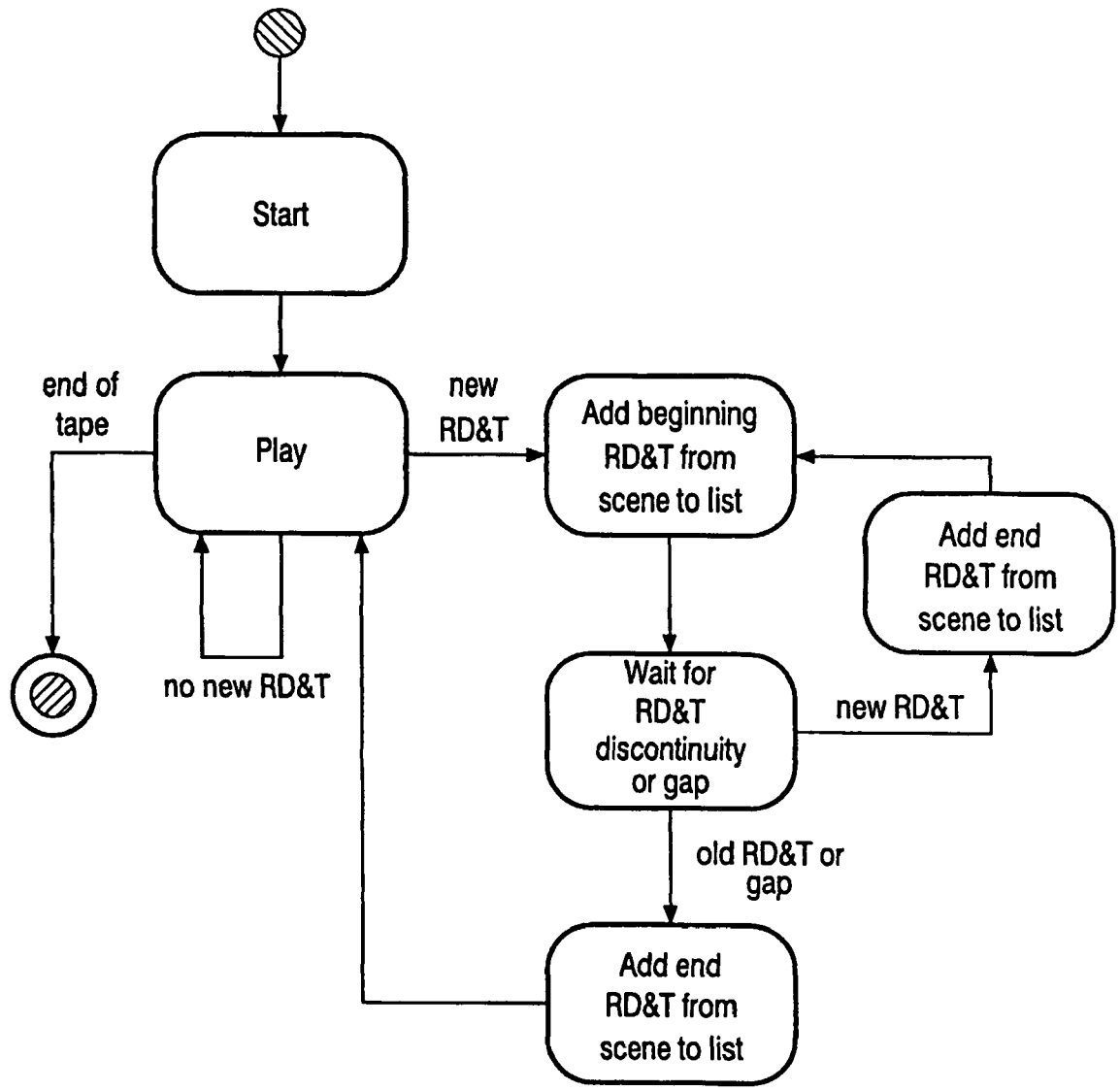
FIG. 8 shows details of the scan tape super-state of the full scan method.

FIG. 8 shows details of the scan tape super-state for the full scan method. The scan tape super-state can be broken down into a few simple components. First, the state will start the recording device by sending the "play" command. The archiving device will try to find an RD&T that is younger than the last RD&T belonging to the currently inserted archiving medium in the received stream. In the archiving device a list is constructed during the full scan. When a new RD&T is found the RD&T and a scene begin marker are inserted into the list. It is advantageously to also add information about the absolute position of the corresponding scene on the recording medium. This information can have the format of an n-bit tape counter or of the pre-formation of the recording medium for example. This information can be used for winding quickly to a start position of a scene.

As soon as the scene changes (RD&T discontinuity), or a gap is found, a scene end marker and, according to the implementation, the absolute position is inserted into the list. The received audio/video stream continues and as soon as a new RD&T is found another scene begin marker is set in the list. After another RD&T discontinuity another scene end marker is set. This loop goes on until no more new RD&Ts are found.

Figure 9:
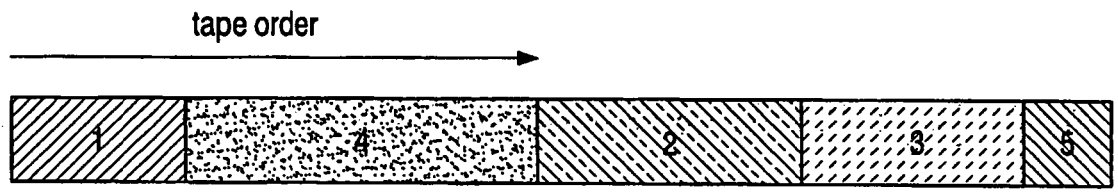
FIG. 9 shows a tape order and scene order found in a list.

FIG. 9 shows one example of an order of scenes on the sequentially accessible recording medium. In this example the chronological order of the scenes is based on their RD&T 1, 2, 3, 4, 5. On the recording medium their order is 1, 4, 2, 3, 5, which corresponds to their order in the list. The inventive full scan algorithm will capture these scenes to the archiving medium in their chronological RD&T order. As the list generated in the update device is a mirror of the contents of the sequentially accessible recording medium, it needs only start playing and the archiving device will know at which point the head of the recording device is. From that point on the full scan algorithm makes the recording device play fast reverse or fast forward, depending on where the next scene to be captured is located.

Figure 10:
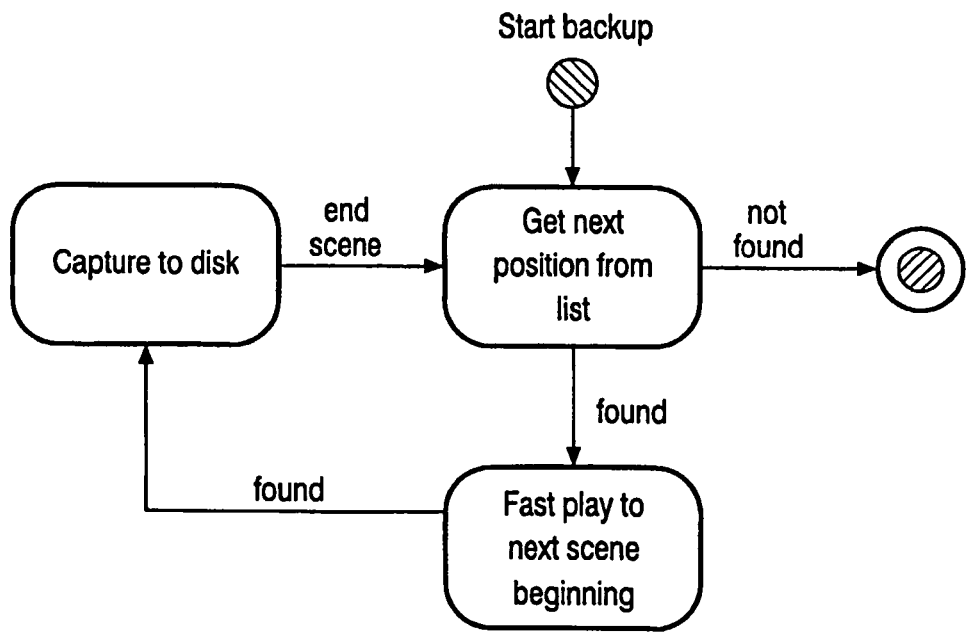
FIG. 10 shows the capturing super-state for the full scan method.

FIG. 10 shows the capturing super-state for the full scan method. Once the scanning is finished and the list is constructed the capturing begins. For that, the scene markers are fetched from the list, this means the position of the oldest scene on the recording means. The position may be defined by the RD&T or potentially by the absolute position on the recording medium. The recording device is then made to go to the corresponding position on the sequentially accessible recording medium. When the point of the scene begin is reached on the recording medium the recording device is remotely controlled by the archiving device to start "normal" play, while the update device captures this scene to disk until the position corresponding to the scene end marker is reached at the same time. When this position is reached the act of capturing is stopped. The RD&Ts just complied are then deleted from the list and a new scene begin marker and a new scene end marker are set. The capturing super-state continues until there are no more scenes markers left.

FIG. 11 shows in partial Figures a) and b) the possible contents of the list generated in the archiving device in the form of a table. In FIG. 1a) the RD&Ts received from the recording device are indicated by year-month-day; hour-minute-second. The RD&Ts belonging to one scene are contiguous. A discontinuity means that another scene begins. In this example a tape counter is used to define that the absolute position of the RD&T on the recording medium is of the 4-bit-type. FIG. 11b) shows another possibility for the definition of the position that is the pre-formatted time code defined by [hh:mm:ss:ff]. For each frame, i.e. each picture, a time code is added to the sequentially accessible recording medium. If the PAL-system is used, the bit rate is 25 frames per second. This means that ff goes from 00, 01 . . . to 24.

In both partial Figures the last two rows indicate where the scene begin markers and the scene end markers are placed. These markers are set after scanning the sequentially accessible recording medium and generating a list with all the RD&T in their physical order. Once a scene has been captured the last RD&T known in the system is refreshed and compared with the RD&Ts belonging to a scene begin marker. Using this procedure it is much faster to determine the current oldest RD&T than to compare the last one known with every single RD&T in the list.

The preferred embodiment of the invention is to attach a Digital Video (DV) camcorder to either a Digital Versatile Disc (DVD) recorder or a hard disk recorder using the "i.Link" IEEE1394 as a connection.

The invention may be summarized as an automatic update performed by an archiving device that controls the device carrying the sequentially accessible recording medium. The update can be performed according to a full scan algorithm or to an append algorithm. Both algorithms arrange things so that only those scenes are captured to the archiving medium that are more recent than the last scene captured in a previous session. The reference for the age is the Recording Date and Time. The full scan algorithm does not make assumptions about how a recording medium has been recorded, whereas the append algorithm is intended for the recording of media used by appending new material after old material. The method of capturing scenes is especially useful for a disk recorder.

The data captured may be an audio/video-stream of a camcorder or the files of a personal computer.

The invention claimed is:

1. A method of capturing data that comprise a recording date and time, said data having been recorded by a first device on a sequentially accessible recording medium carried by the first device, on an archiving medium, said method comprises the steps of:

receiving the data from the first device; and capturing the data on an archiving medium in a second device, characterized in that the second device carrying the archiving medium controls the first device carrying the sequentially accessible recording medium, characterized in that said method includes a full scan algorithm comprising the steps of:

scanning the sequentially accessible recording medium;

determining scenes that comprise continued recording date and time;

determining whether scenes have already been captured on the present archiving medium and the recording date and time of the last captured scene;

comparing recording date and time of the scanned scenes with the last recording date and time on the archiving medium; and capturing those data comprising an audio/video signal and a recording date and time, the recording date and time of which is more recent than the last recording date and time on the archiving medium.

2. The method as claimed in claim 1, characterized in that the full scan algorithm further comprises the steps of:

constructing a list of scenes in the device carrying the archiving medium with the scenes in the order in which they are physically located on the sequentially accessible recording medium;

placing a first scene begin marker in a local data structure indicating the place on the sequentially accessible recording medium where the oldest scene to be captured begins;

placing a first scene end marker in a local data structure indicating the place on the sequentially accessible recording medium where the oldest scene to be captured ends;

placing a second scene begin marker in a local data structure indicating the place on the sequentially accessible recording medium where the second oldest scene to be captured begins;

placing a second scene end marker in a local data structure indicating the place on the sequentially accessible recording medium where the second oldest scene to be captured ends; and continuing this loop until there are no more scenes to add.

3. The method as claimed in claim 2, characterized in that a scene end marker is automatically placed in the list when a discontinuity in the recording dates and times is found.

4. The method as claimed in claim 2, characterized in that the position of the scene markers has the format of an n-bit tape counter.

5. The method as claimed in claim 2, characterized in that the position of the scene markers has a format that is added to each frame or picture on the sequentially accessible recording medium.

6. The method as claimed in claim 2, characterized in that the step of capturing the scenes to the archiving medium comprises the sub-steps of:

making the first device carrying the sequentially accessible recording medium wind the recording medium to the position corresponding to the scene begin marker in the list in which the recording date and time is closest to the last recording data and time known;

making the first device carrying the sequentially accessible recording medium start playing back the recorded scenes;

transferring the scenes via a connection to the second device carrying the archiving medium;

capturing those scenes to the archiving medium;

stopping the first device carrying the sequentially accessible recording medium when the end of the position corresponding to the scene end marker is reached;

refreshing the last recording date and time known;

inquiring if there still are recording dates and times in the list;

determining which scene begin marker is closest to the current last recording date and time known; and finishing the full scan algorithm if there are no more recording dates and times left in the list.

7. The method as claimed in claim 1, characterized in that the scenes are captured to the archiving medium in their chronological order.

8. The method as claimed in claim 1, characterized in that the method comprises an append algorithm comprising the following steps of:

verifying if the inserted archiving medium has a last recording data and time stored in its settings;

making the first device carrying the sequentially accessible recording medium start playing so that an audio and video stream is transferred to the second device;

comparing the currently received recording date and time with the last recording date and time of the archiving medium;

making the first device start winding or rewinding the sequentially accessible recording medium to the point of the last recording date and time of the archiving medium, depending on the result of the comparison; and making the first device start playing when the point of the last recording date and time is found on the sequentially accessible recording medium, while the archiving medium captures the received audio and video stream at the same time.

9. The method as claimed in claim 8, characterized in that the sequentially accessible recording medium is rewound to the beginning when the end is reached.

10. The method as claimed in claim 8, characterized in that the sequentially accessible recording medium is rewound to the beginning when a gap is found.

11. The method as claimed in claim 1, characterized in that the second device has an input signal means, and the method further comprises the steps of:

initializing the update by pushing the "start" button on second device carrying the archiving medium;

asking the user to decide whether a full scan should be performed;

initiating an append algorithm if the next input signal comes from a "no" button; and initiating a full scan algorithm if the next input signal comes from a "yes" button.

12. An archiving device carrying a replaceable archiving medium, said archiving device comprising means for receiving and storing data transmitted from a device carrying a replaceable recording medium, and means for performing a method of capturing scenes, characterized in that the device carrying the archiving medium comprises means for controlling the device carrying the recording medium, wherein said controlling means controls the device carrying the recording medium to:

scan the replaceable recording medium, and determine scenes that comprise continued recording date and time, and wherein said means for receiving and storing data and said means for capturing scenes:

determine whether scenes have already been captured on the present archiving medium and the recording date and time of the last captured scene, compare recording date and time of the scanned scenes with the last recording date and time on the archiving medium, and capture those data comprising an audio/video signal and a recording date and time, the recording date and time of which is more recent than the last recording date and time on the archiving medium.

13. The archiving device as claimed in claim 12, characterized in that means for controlling the device carrying the recording medium comprises a cordless or cord requiring interface.

14. The archiving device as claimed in claim 13, characterized in that the archiving device uses a bi-directional connection for both receiving the data stream and transporting the commands.

15. The archiving device as claimed in claim 13, characterized in that the archiving device is equipped with a non-volatile memory.

16. The archiving device as claimed in claim 15, characterized in that in the non-volatile memory stores identification of the replaceable archiving media and the corresponding last recording date and time known.

17. The archiving device as claimed in claim 13, characterized in that the archiving device is a disk recorder and that the archiving medium is one of the group consisting of: compact disk, digital versatile disk, hard disk.

* * * * *